UNITED STATES PATENT OFFICE.

ISAAC WILLIAM FORBES, OF LA PORTE, INDIANA.

IMPROVEMENT IN POLISHING ORES TO AID IN AMALGAMATING THE PRECIOUS METALS.

Specification forming part of Letters Patent No. 115,293, dated May 30, 1871.

I, ISAAC WILLIAM FORBES, of the city and county of La Porte and State of Indiana, have invented a new and useful Improvement in the Process of Cutting, Cleaning, Scouring, Polishing, Grinding, and Pulverizing all substances for which diamond, emery, or stone are applicable, for the purpose set forth, except for cutting, cleaning, scouring, polishing, and grinding diamond, glass, and other things for which diamond has been used, of which improvement the following is a specification:

It is well known that whenever any substance requires to be cut, cleaned, scoured, polished, or ground, if stone or emery are used they soon become dull or worn out, or both, causing delay, expense, and loss of time in repairing and replenishing; and that the harder the material to be cut, cleaned, scoured, polished, ground, or pulverized, the sooner the emery or stone becomes dull or worn out; that diamond, being the hardest and sharpest, is, therefore, the most durable and desirable substance for such use and purpose when it is applicable.

Now I have discovered, first, that to prevent the aforesaid losses of time and expense in repairing and replenishing implements and devices used for the purposes above set forth, and thereby to make labor more productive and profitable and result in the greatest practicable remuneration for the time and labor expended, the harder, sharper, and more durable the material used for the abrading or grinding surface of the implement or device employed for the purpose set forth the better; second, that diamond, possessing these requisite qualities in a higher degree than any other known substance, is, therefore, the most effectual, valuable, and desirable substance or material which can be employed for cutting, cleaning, scouring, polishing, and grinding all substances for which emery, stone, or diamond are applicable.

In carrying out my discovery I would use diamond in any way best adapted for producing the desired effect, and with the most approved mechanical devices, constructed of material and shape and having the motion most suitable therefor. I would use diamond in place of other material now used for the purpose above set forth, and in the most convenient way consistent with its natural shape and the shape and motion required to do the work most effectively. I would use the diamond set in metallic substance, or I would coat the metallic or other substances best suited for the business with diamond-paste of any consistency, or diamond mixed with cement or India rubber, and embed the diamond therein, on belts, wheels, rollers, or pulleys, convex, concave, male or female, or in any shape best suited for the purpose.

I do not confine myself to any particular shape or motion, or manner of using the diamond, but would use it to the best advantage, with or without mechanical device for producing the desired effect.

I disclaim the process of cleaning pulverized ores by the employment of emery as a medium, the same being the subject-matter of an application for Letters Patent filed by me at an earlier date; but I do claim as an improvement thereon—

The improved process by the employment of diamond as a medium, substantially as and for the purpose described.

La Porte, Indiana, January 21, 1871.

I. W. FORBES.

Witnesses:
WM. E. HIGGINS,
H. C. SHANNON.